United States Patent [19]
Parry et al.

[11] Patent Number: 4,750,284
[45] Date of Patent: Jun. 14, 1988

[54] TAG ASSEMBLIES

[75] Inventors: John S. Parry, Stroud; Hugh R. Dent, Cirencester, both of England

[73] Assignee: Sterimatic Holdings Limited, Tortola, British Virgin Isls.

[21] Appl. No.: 875,236

[22] Filed: Jun. 16, 1986

[30] Foreign Application Priority Data

Jul. 6, 1985 [GB] United Kingdom ............... 8517191
Sep. 10, 1985 [GB] United Kingdom ............... 8522432

[51] Int. Cl.⁴ ............................................. A01K 13/00
[52] U.S. Cl. ....................................... 40/301; 119/156
[58] Field of Search .................... 40/300, 301, 302; 119/156; 24/17 AP, 30.5 P, 16 PB

[56] References Cited

U.S. PATENT DOCUMENTS

| | | | |
|---|---|---|---|
| 2,325,906 | 8/1943 | Claffey | 40/302 |
| 2,361,506 | 10/1944 | Smith | 24/17 AP |
| 3,837,101 | 9/1974 | Young | 24/17 AP |
| 3,949,708 | 4/1976 | Meeks | 119/156 |
| 4,184,453 | 1/1980 | Ritchey | 40/301 |
| 4,259,798 | 4/1981 | McConnell | 40/300 |
| 4,359,015 | 11/1982 | Ritchey | 119/156 |
| 4,428,327 | 1/1984 | Steckel | 119/156 |
| 4,471,546 | 9/1984 | Bolling | 40/301 |
| 4,579,085 | 4/1986 | McGuire | 40/301 |
| 4,612,877 | 9/1986 | Hayes | 119/156 |
| 4,674,445 | 6/1987 | Cannelongo | 119/156 |

FOREIGN PATENT DOCUMENTS

| | | | |
|---|---|---|---|
| 681381 | 10/1952 | United Kingdom | 40/301 |
| 2002696 | 2/1979 | United Kingdom | 40/301 |

Primary Examiner—Henry E. Raduazo
Attorney, Agent, or Firm—Young & Thompson

[57] ABSTRACT

A tag assembly comprises male and female tag members intended to be disposed on opposite sides of an animal's ear and to be held together by a part passing through the ear. The female tag member has a laminar body and a laminar extension in the plane of the body having an arrow-shaped head which may be forced through a curved slot in an attachment member in order to securely attach the attachment member to the tag assembly. The attachment member, which may serve a marking function or as a means of applying insecticide to the animal, is readily replaceable by a fresh attachment member without removing the tag assembly from the animal, and, if desired, more than one attachment member may be accommodated at a time on the extension.

6 Claims, 1 Drawing Sheet

TAG ASSEMBLIES

BACKGROUND OF THE INVENTION

This invention relates to tag assemblies, and is more particularly, but not exclusively, concerned with such assemblies for use in the tagging of livestock.

It is a widespread practice for farmers to tag livestock, particularly cattle, as a means of identification, or as a means of determining whether an animal has received a particular treatment, or even as a means of applying an insecticide or insect repellant to the animal. The tag assembly generally comprises a male tag member having a projecting portion which is passed through the animal's ear using a special fitting tool and is then locked in a receiving well in a female tag member. Once inserted in the receiving well the projecting portion cannot be withdrawn, and the tag assembly can only be removed from the animal's ear by cutting.

Such tag assemblies often require frequent replacement, and the necessity to replace the complete tag assembly with a new tag assembly is costly and also disturbing for the animal. In addition it increases the risk of infection due to penetration of the ear.

U.S. Specification No. 4,428,327 discloses an ear tag assembly having an insecticide-impregnated panel which is held against the flat identification area of the assembly by a snap coupling and which can be removed for replacement by a fresh panel at the end of its useful life. However, the fitting and replacement of such a panel to a tag assembly attached to an animal presents considerable difficulties in practice, and in addition such an arrangement does not permit fitting of various attachments provided for different tagging purposes.

It is an object of the invention to provide an improved tagging system enabling fitting of various attachments on the tag assembly in a manner which renders fitting and replacement of the attachment particularly straightforward whilst ensuring that the attachment is securely held on the tag assembly when fitted.

SUMMARY OF THE INVENTION

According to one aspect of the invention there is provided a tag member having a laminar body and an attachment portion for attaching the tag member to a further tag member, wherein the attachment portion is in the form of a laminar extension in the plane of the body having a head adapted to be forced through an aperture in the further tag member to attach the tag member to the further tag member.

It should be understood that the term "tag" as used in this specification is intended to include any form of tag for attachment to an animal or object, whether the tag is to be used for identification or purely for aesthetic purposes and, in the case of the tag being attached to an animal, whether the tag is to be attached to an ear or some other part of the animal. The term "animal" is used here to include humans.

In a preferred embodiment the head has lateral edges which diverge in the direction from the free end of the head towards the body to assist passage of the head through the aperture. Furthermore the head preferably has two barbs disposed laterally one on each side of the head for engaging the further tag member on each side of the aperture after attachment of the tag member to the further tag member, so as to prevent the head from being withdrawn through the aperture.

According to another aspect of the invention, there is provided a tag member having a laminar body and an attachment portion for attaching the tag member to a further tag member also having a laminar body and a complementary attachment portion in the form of a laminar extension in the plane of the body having a head, wherein the attachment portion of the first-mentioned tag member is in the form of an aperture in the body through which the head may be forced to attach the tag member to the further tag member.

In a preferred embodiment the aperture is positioned close to one edge of said first-mentioned tag member. Furthermore the aperture is preferably in the form of a slot which is curved in the direction of its length and away from the body of the further tag member when the tag member is attached to the further tag member.

It is preferred that the tag member which is adapted for attachment to the part to be tagged is that having its attachment portion in the form of a laminar extension, and that the other tag member having its attachment portion in the form of an aperture constitutes a replaceable attachment member. This guards against the animal being snared by its permanently attached tag member becoming snagged on an obstruction, such as a barbed wire fence. However, it is quite feasible for the functions of the two tag members to be reversed, so that it is the tag member with the aperture which is adapted for attachment to the part to be tagged and the tag member with the laminar extension which constitutes the attachment member.

The attachment member may serve a number of different purposes. It may incorporate an insecticide or insect repellant, in which case the insecticide or insect repellant may be in the form of a surface coating on the member or may be impregnated throughout the body of the member. Alternatively it may serve a marking function by being of a distinctive colour or shape or by being provided with a distinctive code or electronic indication.

The invention also provides a tag assembly comprising a first tag member for attachment to the part to be tagged, and a second tag member for attachment to the first tag member, wherein each of the first and second tag members has a laminar body and an attachment portion, the attachment portion of one of the tag members being in the form of a laminar extension in the plane of the body having a head, and the attachment portion of the other tag member being in the form of an aperture in the body through which the head may be forced to attach the second tag member to the first tag member.

BRIEF DESCRIPTION OF THE DRAWINGS

In order that the invention may be more fully understood, a preferred embodiment of the invention will now be described, by way of example, with reference to the accompanying drawings, in which.

DETAILED DESCRIPTION OF THE DRAWINGS

Figure 1:
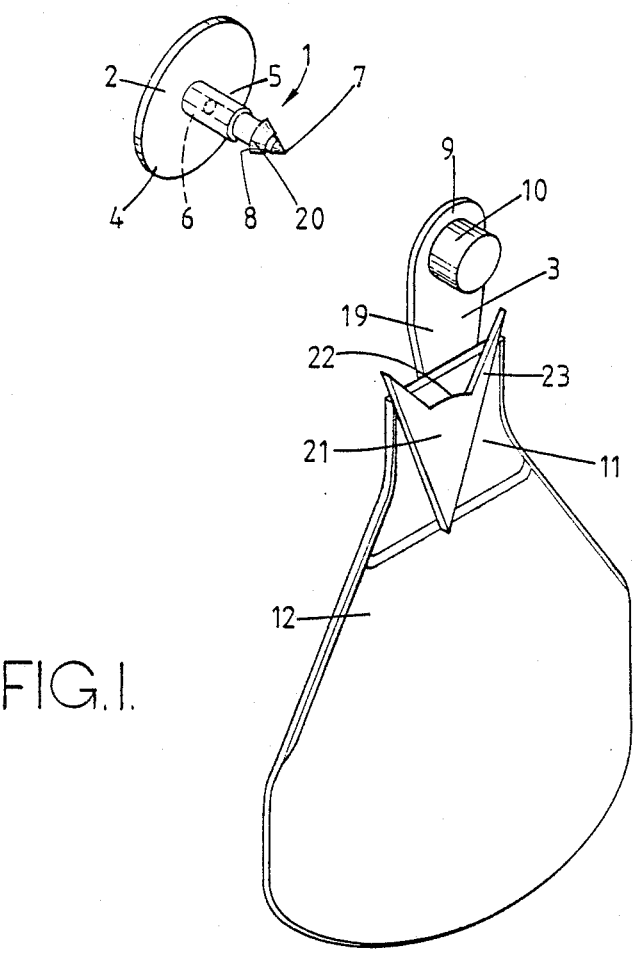
FIG. 1 is a perspective view of the preferred tag assembly.

Referring to FIG. 1, the tag assembly 1 is provided for fitting to an animal's ear, and comprises male and female tag members 2 and 3 intended to be disposed on opposite sides of the ear and to be held together by a part passing through the ear, when fitted to the animal. The male member 2 comprises a disc 4 and a projecting portion 5 projecting from one side of the disc 4 and having a bore 6 (shown in broken lines) accommodating a brass insert 20 as a force fit therein and extending through the disc 4 so as to open on the opposite side of the disc 4. The insert 20 defines a tip 7 for piercing the animal's ear, the tip 7 having a shoulder 8 whose function will become apparent from the description below.

The female tag member 3 comprises a laminar body 9 and a receiving portion 10 of generally cylindrical form which projects from that surface of the body 9 which faces away from the male tag member 2 when the tag members 2 and 3 are fitted together to form the tag assembly 1. The receiving portion 10 is in the form of a closed container defining a cylindrical chamber which contains sterilising means, preferably in the form of a cream or gel sterilising substance, as described in British patent application No. 8519557, and/or other chemical treatment means.

When the tag assembly 1 is to be fitted to an animal's ear, a special fitting tool is used having two jaws one of which is provided with a recess in which the receiving portion 10 of the female tag member 3 is received and the other of which is provided with a projecting part which is inserted in the bore 6 in the projecting portion 5 of the male tag member 2. The fitting tool is positioned so that the animal's ear lies between the two jaws and thus between the male and female tag member 2 and 3, and the jaws are then closed so as to cause the tip 7 to pierce the animal's ear and pass through a weakened portion of the disc 9 into the cylindrical chamber of the receiving portion 10. The shoulder 8 on the tip 7 subsequently prevents the tip 7 from being withdrawn from the chamber, so that a permanent connection is established between the male and female tag members 2 and 3. The manner of fitting of the tag assembly 1 to the animal's ear and the manner in which the wound formed thereby is sterilised by the sterilising substance within the receiving portion 10 are described in more detail in British Patent Application No. 8519557.

Figure 2:
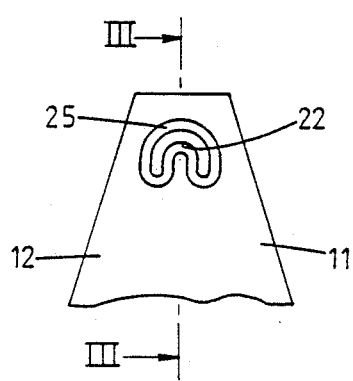
FIG. 2 shows a variant of part of the assembly.

Furthermore a laminar extension 19 having an arrow-shaped head 21 is integrally formed on the female tag member 3 in the plane of the body 9, and an attachment member 11 having a laminar body 12 of resiliently deformable material is formed with a complementary formation in the form of a curved slot 22, as best seen in FIG. 2, appropriately dimensioned in relation to the arrow-shaped head 21. The head 21 is capable of being forced through the slot 22 with the diverging lateral edges of the head 21 serving to resiliently deform the material surrounding the slot 22 during passage through the slot 22. When the head 21 has passed through the slot 22, two barbs 23 disposed one on each side of the head engage the body 12 on each side of the slot 22 and prevent the head 21 from being subsequently withdrawn through the slot 22. The female tag member 3 is preferably made of relatively inflexible plastics material so as to ensure that the attachment member 11 cannot be pulled off by deformation of the material of the head 21.

Figure 3:
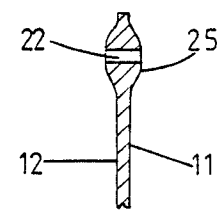
FIG. 3 is a section taken along the line III—III in FIG. 2.

In a variant of the above-described embodiment the material of the body 12 is strengthened in the vicinity of the slot 22 by being thickened in a region 25 as shown in FIGS. 2 and 3, so as to aid holding of the attachment member 11 on the female tag member 3. In a further, non-illustrated variant the material of the head 21 is similarly thickened to further aid holding of the attachment member 11.

It will accordingly be appreciated that the attachment member 11 is readily attachable to the tag assembly 1 when the assembly 1 is fitted to the animal's ear, and that no special tool is required for such attachment. In addition, once attached, the attachment member 11 cannot be easily be dislodged by the animal. In fact it has been found that the force required to pull the attachment member 11 off the assembly is so great that, in practice, the male and female tag members 2 and 3 will part before this point is reached. Furthermore, when necessary, the attachment member 11 can be simply replaced by a fresh attachment member, for example when its insect repellant properties become less effective with age or when a new marking is to be applied to the animal, by cutting the old attachment member off the head 21 and fitting the new attachment member in the manner already described.

The length of the extension 19 is such that more than one attachment member 11 may be accommodated at a time on the extension 19. Where an insecticide-impregnated attachment member 11 on the extension 21 becomes less effective with age, therefore, a fresh attachment member 11 may be fitted on the extension 21 without the old attachment member 11 having to be removed. This is advantageous not only because it renders the fitting operation easier, but also because it enables the remaining insecticidal properties of the old attachment member 11 to be used to reinforce the insecticide function of the fresh attachment member 11.

It is envisaged that the general concept of this invention may also be applied to human earrings to enable a replaceable attachment member, having insecticidal properties or acting as a carrier for a perfume for example, to be fitted to an earring.

We claim:

1. A tag assembly comprising a first tag member having a connecting portion for attaching said tag member to a part to be tagged, and a second, detachable tag member for attachment to a part of said first tag member spaced from said connecting portion, wherein each of said first and second tag members has a laminar body and attachment portion, said attachment portion of one of said tag members being in the form of a laminar extension in the same plane as said laminar body of said one tag member, said laminar extension having opposite lateral edges and a head in the form of lateral projections extending laterally outwardly of said edges in said plane, and said attachment portion of the other of said tag members being in the form of an aperture in said body of said other tag member through which said head may be forced to attach said second tag member to said first tag member, whereby, after said head has been forced through said aperture, said lateral projections engage said other tag member on each side of said aperture so as to prevent said head from being withdrawn through said aperture.

2. A tag assembly according to claim 1, wherein said lateral projections are barbs.

3. A tag assembly according to claim 1, wherein the aperture is positioned close to one edge of said other tag member.

4. A tag assembly according to claim 1, wherein the aperture is in the form of a slot which is curved in the direction of its length.

5. A tag assembly according to claim 1, wherein said other tag member incorporates a region of increased thickness adjacent the aperture.

6. A tag assembly according to claim 1, wherein the second tag member is made of resiliently deformable material.

* * * * *